United States Patent
Bilde

(10) Patent No.: US 9,629,310 B2
(45) Date of Patent: Apr. 25, 2017

(54) GRAIN SEPARATING APPARATUS IN A COMBINE HARVESTER

(71) Applicant: AGCO S/A, Hesston, KS (US)

(72) Inventor: Morten Leth Bilde, Langaa (DK)

(73) Assignee: AGCO A/S, Randers (DK)

( * ) Notice: Subject to any disclaimer, the term of this patent is extended or adjusted under 35 U.S.C. 154(b) by 0 days.

(21) Appl. No.: 15/031,049

(22) PCT Filed: Oct. 23, 2014

(86) PCT No.: PCT/EP2014/072748
§ 371 (c)(1),
(2) Date: Apr. 21, 2016

(87) PCT Pub. No.: WO2015/062965
PCT Pub. Date: May 7, 2015

(65) Prior Publication Data
US 2016/0262311 A1    Sep. 15, 2016

(30) Foreign Application Priority Data
Oct. 31, 2013 (GB) .................................. 1319215.8

(51) Int. Cl.
*A01F 12/44*      (2006.01)
*A01F 12/30*      (2006.01)
*A01F 12/46*      (2006.01)

(52) U.S. Cl.
CPC .............. *A01F 12/30* (2013.01); *A01F 12/44* (2013.01); *A01F 12/46* (2013.01)

(58) Field of Classification Search
CPC ........ A01F 12/30; A01F 12/305; A01F 12/32; A01F 12/44; A01F 12/46; A01D 41/00
(Continued)

(56) References Cited

U.S. PATENT DOCUMENTS 441,511 A * 11/1890 Segur ....................... A47G 1/16
                                                                                                                        248/215
858,294 A *   6/1907 Koester ................... A01F 12/30
                                                                                                                        209/394
(Continued)

FOREIGN PATENT DOCUMENTS

DK       GB 2487193 A *   7/2012 ............. A01F 12/30
DK    WO 2014082820 A1 *   6/2014 ............. A01F 12/44
(Continued)

OTHER PUBLICATIONS

Intellectual Property Office, International Search Report for UK Priority Application No. GB1319215.8, dated Apr. 11, 2014.
(Continued)

*Primary Examiner* — Thomas B Will
*Assistant Examiner* — Joan D Misa

(57) ABSTRACT

A combine harvester (10) comprising axial separating apparatus (24, 5) is provided. The axial separating apparatus comprises at least one rotor (28) mounted for rotation in a rotor cage (30) and is arranged to convey crop material in a spiral path from a front end to a rear end. The rotors (28) may also serve to thresh the crop material before separation. The rotor cage (30) includes a grate (34) for allowing separated grain to fall there through under gravity. Two return conveyors (42, 44) are positioned below the grate (34), one behind the other. A first return conveyor (42) disposed under a front portion of the separating apparatus is arranged to catch a portion of said separated grain and convey the caught grain forwardly to a first front edge (46) from where the grain falls under gravity onto a first region of an underlying grain pan (60). A second return conveyor (44) disposed under a rear portion of the separating apparatus is arranged to catch a portion of said separated grain and convey the caught grain forwardly to a second front edge (50) from where the grain falls under gravity at a
(Continued)

distance located behind the first region. The grain pan (60) serves to convey the collected grain in a rearward direction to a cleaning unit (64).

7 Claims, 3 Drawing Sheets

(58) Field of Classification Search
USPC .......................................................... 460/80
See application file for complete search history.

(56) References Cited

U.S. PATENT DOCUMENTS

| | | | | |
|---|---|---|---|---|
| 2,303,249 | A * | 11/1942 | Ashton | A01F 12/44 209/151 |
| 4,149,360 | A * | 4/1979 | Rowland-Hill | A01F 7/06 460/67 |
| 4,259,829 | A * | 4/1981 | Strubbe | A01D 41/1276 460/1 |
| 4,531,528 | A * | 7/1985 | Peters | A01F 12/44 460/97 |
| 4,611,605 | A | 9/1986 | Hall et al. | |
| 4,739,773 | A | 4/1988 | West et al. | |
| 4,821,744 | A | 4/1989 | Turner et al. | |
| 4,969,853 | A * | 11/1990 | Coers | A01F 7/06 460/69 |
| 5,088,960 | A * | 2/1992 | Stickler | A01F 7/065 460/100 |
| 5,152,717 | A | 10/1992 | Nelson et al. | |
| 5,403,235 | A * | 4/1995 | Baumgarten | A01F 12/30 209/139.1 |
| 5,466,190 | A * | 11/1995 | Skinner | A01F 12/44 460/101 |
| 5,885,155 | A * | 3/1999 | Dwyer | A01F 12/18 460/109 |
| 6,244,955 | B1 * | 6/2001 | Bischoff | A01D 61/008 460/114 |
| 6,468,153 | B2 * | 10/2002 | Sheidler | A01F 7/065 460/100 |
| 6,494,782 | B1 * | 12/2002 | Strong | A01D 41/1271 460/71 |
| 6,773,343 | B2 * | 8/2004 | Grywacheski | A01F 12/446 460/100 |
| 6,902,477 | B2 * | 6/2005 | Braunhardt | A01F 7/067 460/69 |
| 6,932,697 | B2 * | 8/2005 | Baumgarten | A01D 41/1276 460/1 |
| 7,362,233 | B2 * | 4/2008 | Behnke | A01D 41/1276 340/684 |
| 7,413,507 | B2 * | 8/2008 | Weichholdt | A01F 12/446 460/100 |
| 7,553,226 | B2 * | 6/2009 | Dhont | A01D 75/282 460/101 |
| 7,833,091 | B2 * | 11/2010 | Holtmann | A01D 41/12 460/114 |
| 8,333,640 | B2 * | 12/2012 | Bussmann | A01F 7/067 460/80 |
| 8,676,453 | B2 * | 3/2014 | Behnke | A01D 41/1276 460/101 |
| 2005/0003876 | A1 | 1/2005 | Kuhn et al. | |
| 2014/0066145 | A1 | 3/2014 | Bilde | |
| 2014/0141849 | A1 * | 5/2014 | Hollatz | A01F 7/02 460/80 |
| 2014/0298766 | A1 * | 10/2014 | Furmaniak | A01F 12/56 56/14.6 |
| 2014/0342787 | A1 * | 11/2014 | Roberg | A01F 12/30 460/83 |
| 2015/0366139 | A1 * | 12/2015 | Rittershofer | A01D 41/12 460/114 |
| 2016/0007536 | A1 * | 1/2016 | Bussmann | A01D 41/12 460/83 |
| 2016/0007538 | A1 * | 1/2016 | Fuchs | A01F 12/46 460/114 |
| 2016/0192591 | A1 * | 7/2016 | Missotten | A01F 12/444 460/100 |
| 2016/0302361 | A1 * | 10/2016 | Bojsen | A01F 12/56 |
| 2016/0309657 | A1 * | 10/2016 | Bilde | A01F 12/44 |

FOREIGN PATENT DOCUMENTS

| | | |
|---|---|---|
| EP | 2156727 A2 | 2/2010 |
| FR | 2651088 A1 | 3/1991 |
| GB | 2024594 A | 1/1980 |
| GB | 2038604 A | 7/1980 |
| WO | 2012/095239 A1 | 7/2012 |

OTHER PUBLICATIONS

European Patent Office, International Search Report for parent International Patent Application No. PCT/EP2014/072748, mailing date Jan. 30, 2015.

* cited by examiner

GRAIN SEPARATING APPARATUS IN A COMBINE HARVESTER

CROSS-REFERENCE TO RELATED APPLICATIONS

The present application claims the benefit of and priority from United Kingdom Application number 1319215,8, filed Oct. 31, 2013, the entire disclosure of which is hereby incorporated by reference.

BACKGROUND

The invention relates to combine harvesters and particularly to the return conveyance means that serves to catch falling grain from separating apparatus and convey the caught grain forwardly to a grain pan upstream of a cleaning unit.

For many decades, self-propelled combine harvesters have been used by farmers to harvest a wide range of crops including cereals, maize and oil-seed rape. Typically, a combine harvester cuts the crop material, threshes the grain therefrom, separates the grain from the straw, and cleans the grain before storing in an on-board tank. Straw and crop residue is ejected from the rear of the machine.

WO-2012/095239 discloses a combine harvester having a hybrid-type processor which includes a threshing cylinder that rotates on a transverse axis upstream of a pair of axial rotors. The crop stream is fed into the front side of the threshing cylinder and is conveyed tangentially around the underside thereof in a generally rearward direction. Grain and chaff separated at this stage falls onto an underlying grain pan which is driven in an oscillating manner to convey the grain and chaff rearwardly to a rear edge from where the grain and chaff falls under gravity into a cleaning unit.

The remainder of the crop stream from the threshing process is conveyed rearwardly from the threshing cylinder into separating apparatus which comprises a pair of side-by-side rotors which operate in an axial manner wherein the crop stream is conveyed in a spiral path from front to rear.

During the separating process further grain and chaff is removed from the straw and falls under gravity through a grate onto an underlying return pan which conveys the grain and chaff forwardly to a front edge from where it falls under gravity onto the grain pan. The straw by-product from the separating apparatus is ejected from the rear of the combine.

In a pure 'axial' type combine, the conventional threshing cylinder is omitted and both threshing and separation is executed by one or more axial rotors.

The cleaning unit of most combines operates according to a well-established process in which grain and chaff cascading down from the grain pan is subjected to an airstream created by a fan. The airstream blows the lighter chaff and dust rearwardly and out of the combine whilst the heavier grain falls onto and through a series of cleaning sieves before being conveyed to the grain tank.

WO-20121095239 discloses the recognition that improved stratification of the layer of grain and material other than grain (MOG) on the grain pan upstream of the cleaning unit improves the cleaning process. Lighter material tends to the top of the layer whilst the grain settles on the bottom. When subjected to the cleaning airstream, the MOG is carried away from the grain layer more effectively.

There is a desire to improve the stratification of the crop material on the grain pan immediately upstream of the cleaning unit.

SUMMARY OF INVENTION

It is thus one object of the invention to provide a combine harvester with increased capacity.

It is another object of the invention to improve the stratification of the crop material on the grain pan immediately upstream of the cleaning unit.

According to the invention there is provided a combine harvester comprising axial separating apparatus having at least one rotor mounted for rotation in a rotor cage and arranged to convey crop material in a spiral path from a front end to a rear end, the rotor cage including a grate for allowing separated grain to fall there through under gravity, a first return conveyor disposed under a front portion of the separating apparatus and arranged to catch a portion of said separated grain and convey the caught grain forwardly to a first front edge from where the grain falls under gravity onto a first region of an underlying grain pan, a second return conveyor disposed under a rear portion of the separating apparatus and arranged to catch a portion of said separated grain and convey the caught grain forwardly to a second front edge from where the grain fails under gravity at a distance behind the first region, the grain pan serving to convey the collected grain in a rearward direction to a cleaning unit.

By providing two return conveyors the grain is collected from the separating apparatus in two separate streams, each being dropped onto the grain pan (alternatively termed the stratification pan) in two separate places.

The invention involves the recognition that the material discharged from the front region of separating apparatus is richer in grain than that falling through a rear region. In striving for improved stratification of the crop material on the grain pan, the first, forward-most, return conveyor advantageously drops this grain-rich mix near to the front of the stratification pan thus maximising the stratification that takes place upstream of the cleaning unit.

The remainder of the material falling from the rear region of the separating apparatus is more rich in MOG and is collected by the second return conveyor and dropped at a position behind that of the first grain-rich portion. In effect, the more MOG-rich, or dirtier, material is dropped onto the cleaner grain-rich material already stratified on the pan. Advantageously, the dual return conveyor thus improves stratification of the collected grain and MOG.

The first and/or the second return conveyor may comprise a respective oscillating return pan which is coupled to an oscillating drive mechanism in a known manner. Alternatively, the first and/or the second return conveyor may comprise an endless-belt arrangement.

The separating apparatus may comprise a pair of axial separating rotors arranged in a side-by-side relationship. In this case each of the first and second return conveyors preferably extend across the discharge width of both rotors. Alternatively, the separating apparatus may comprise more or less than two axial separating rotors.

In a preferred arrangement the first return conveyor has a rear edge that resides over the grain pan and, therefore, the whole length of the first conveyor resides over the grain pan. Preferably, all material discharged through the grate of the separating apparatus is caught by one of the first and second grain conveyors thus placing the caught material onto the grain pan in an optimal position for stratification.

The second front edge is preferably disposed forwardly of a rear edge of the grain pan so that the relatively MOG-rich material conveyed by the second conveyor is dropped onto the top surface of the grain-rich layer on the grain pan. The material layer that falls from the rear edge of the grain pan is, therefore, stratified, at least in part, by the provision of two return conveyors.

The second return conveyor is preferably at least twice as long as the first return conveyor, and more preferably three times as long. The chosen dimensions may be determined by the discharged grain-MOG profile from front to rear of the separating apparatus. The inventors recognise that the majority of the grain discharged by the separating apparatus falls over a relatively short length from the front. This is in contrast to the remaining length further back which, although typically discharges a portion of the grain, the discharged mix has a significantly higher MOG content. As a result, the forward-most return conveyor is preferably shorter than the rear-most return conveyor so as to optimise stratification on the grain pan.

BRIEF DESCRIPTION OF DRAWINGS

Further advantages of the invention will become apparent from reading the following description of a specific embodiment with reference to the appended drawings in which.

DETAILED DESCRIPTION OF SPECIFIC EMBODIMENTS

From reading the following description it should be understood that the terms 'longitudinal', 'transverse', 'front', 'rear', 'forward', 'rearward', 'in front' and 'behind' are made in relation to the combine harvester's normal direction of travel. In other words, the term 'longitudinal' equates to the fore and aft direction, whereas the term 'transverse' equates to the crosswise direction, or left and right. Furthermore, the terms 'axial' and 'radial' are made in relation to a rotating body such as a shaft wherein axial relates to a direction along the rotation axis and radial equates to a direction perpendicular to the rotation axis.

Figure 1:
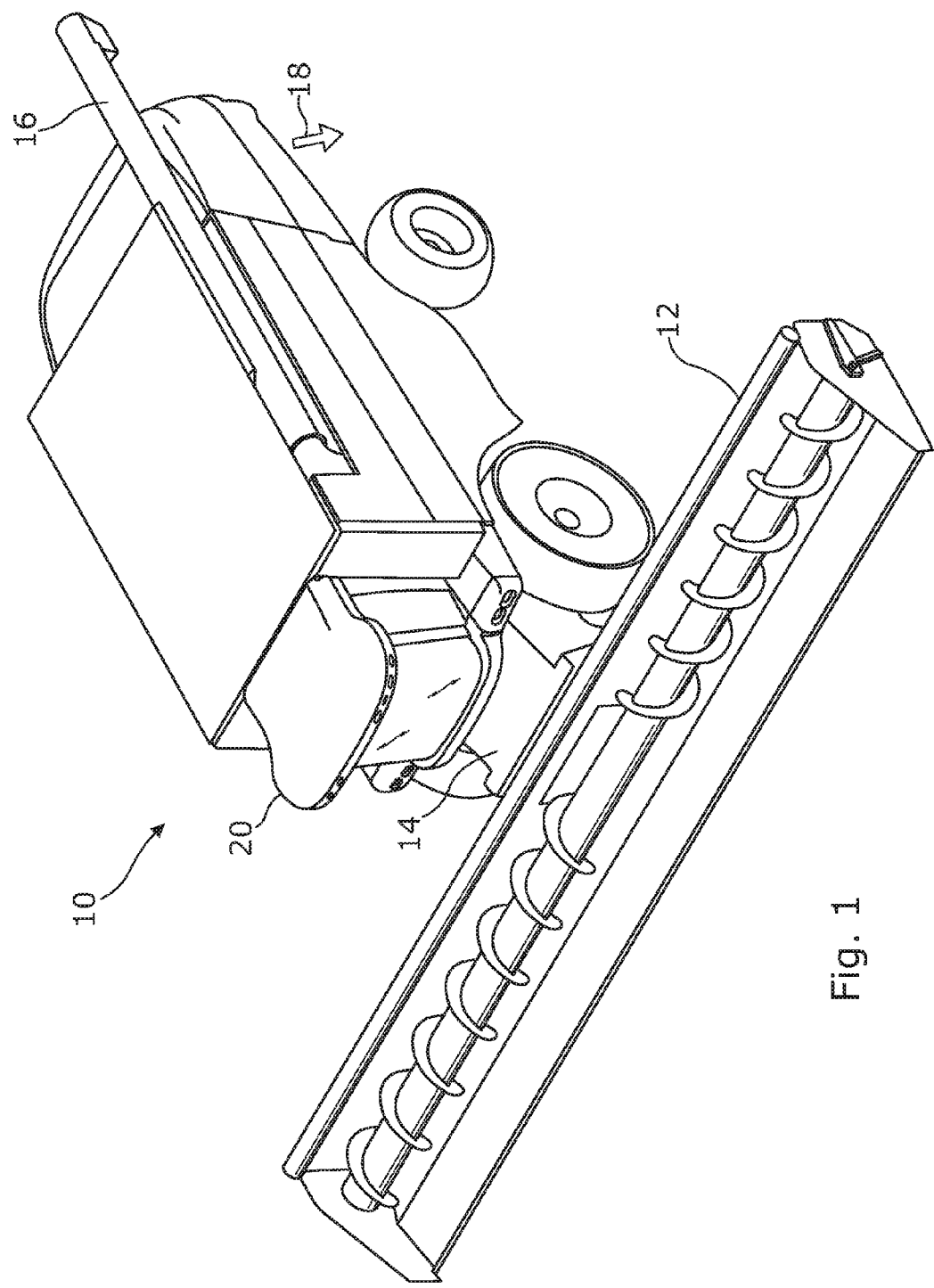
FIG. 1 is a schematic perspective view of a combine harvester.

With reference to FIG. 1, a self-propelled combine harvester 10 comprises a header 12 which cuts and gathers a strip of crop as the combine harvester is driven across a crop field. An elevator section 14 conveys the crop stream from the header 12 into a central processing apparatus described in more detail below and hidden from view in FIG. 1. Clean grain separated from the crop stream is collected in a storage tank which is periodically emptied into a trailer (not shown) via an unloading auger 16, here shown folded away in a transport position. Residue material, or material other than grain (MOG), remaining from the crop stream such as straw and chaff is ejected from the rear of the machine represented by arrow 18. For completeness the combine 10 includes a driver's cab 20.

Figure 2:
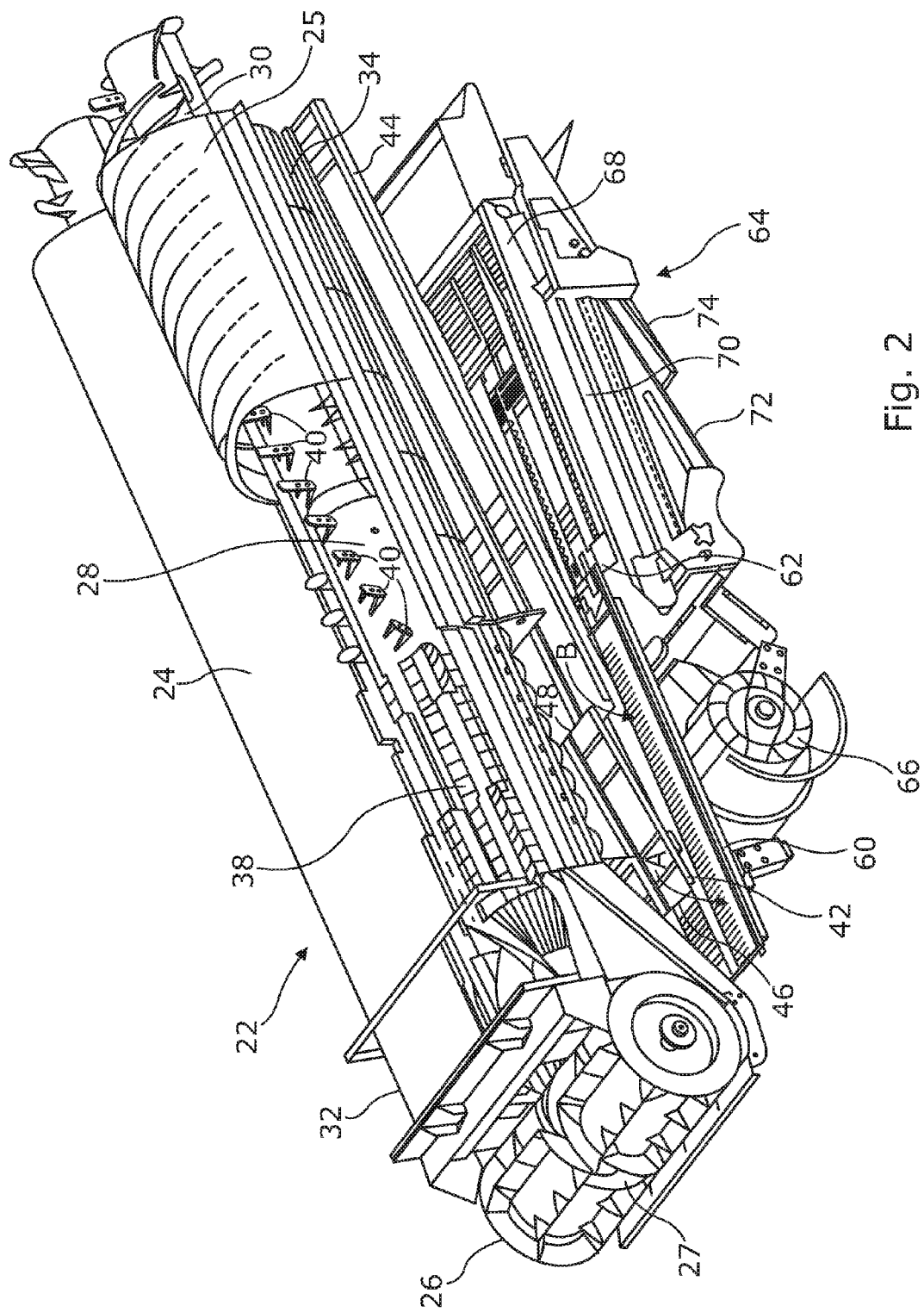
FIG. 2 is a top-left-front perspective view of a combine harvester processor and cleaning unit in accordance with an embodiment of the invention; and, FIG. 3 is vertical sectional view taken through the processor and cleaning unit of FIG. 2.
Figure 3:
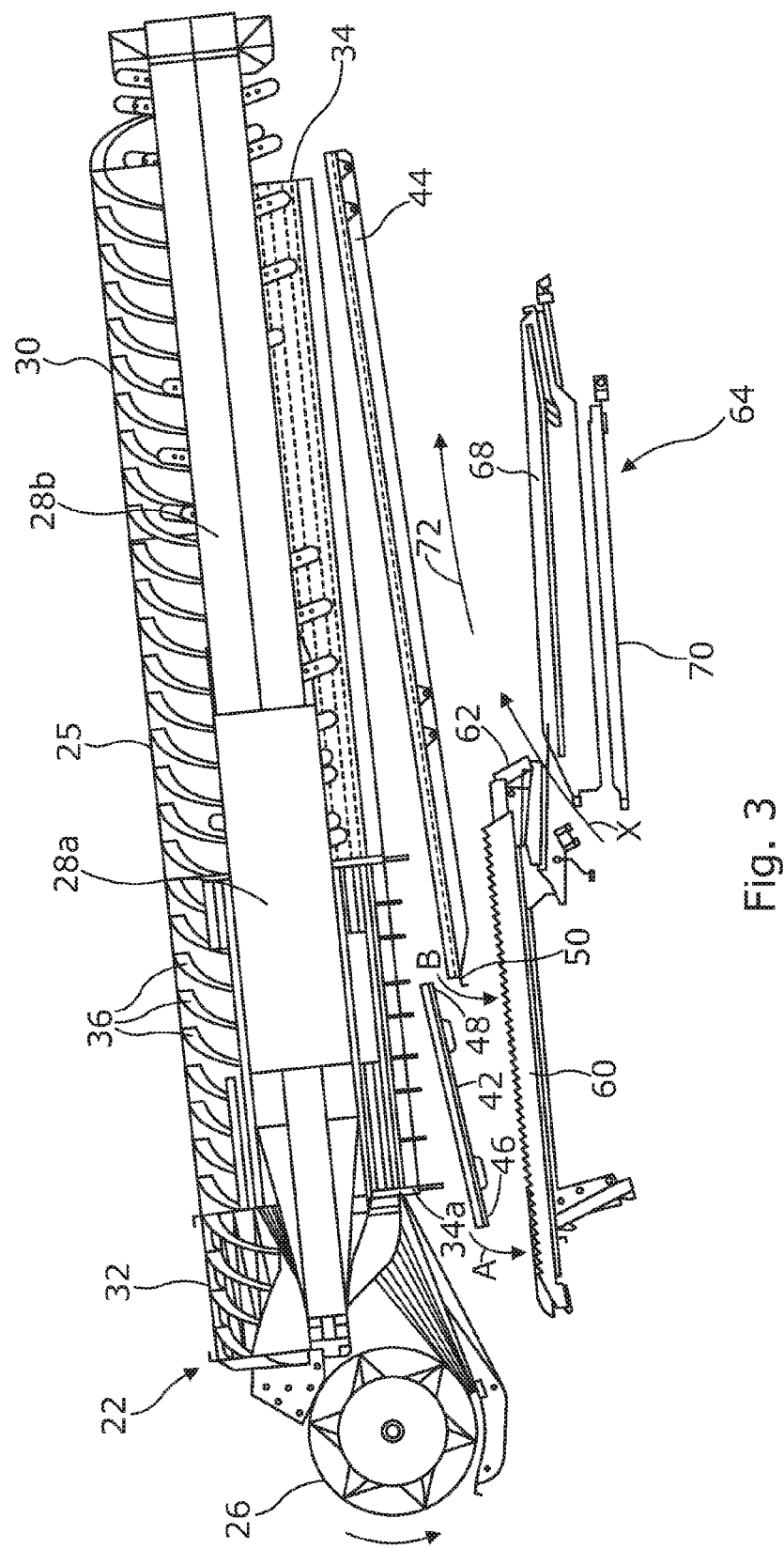

Turning to the details of the crop processing apparatus 22, as shown in FIG. 2 and, the cut crop stream is fed tangentially from the elevator 14 into the front end of a pair of axial rotary units 24, 25 by a feed beater 26 which rotates anticlockwise as viewed from the left in FIG. 3. Angled vanes on the feed beater 26 serve to divide the crop stream into two crop streams which are each fed into a respective one of the rotary units 24, 25.

Left-hand rotary unit 25 comprises a rotor 28 mounted longitudinally for rotation within a rotor cage 30. Right-hand rotary unit 24 is of the same, albeit mirrored, construction.

Each rotor cage 30 is substantially cylindrical in shape and juxtaposes at the front end a transition housing 32 which serves to guide the crop material from generally rearward flow under the feed beater 26 to a spiral flow around the rotor 28. A lower portion of the cage structure provides a grate 34 through which separated grain and chaff can fall through under gravity.

Guide vanes 36 are mounted to the inside surface of cage 30 to shift the crop material in a rearward direction as it encircles the rotor 28.

A front region 28a of the rotor 28 includes longitudinally mounted rasp bars 38 which, in cooperation with the guide vanes 36, thresh the crop stream. It should be understood that part of the right-hand cage 25 has been omitted from FIG. 2 to reveal the details of the rotor 28.

Behind the front region 28a, a rear region 28b includes a plurality of upstanding fingers 40 mounted to the rotor core. The fingers 40 perform a separating function which separates the grain from the straw.

The rotary units 24, 25 perform both a threshing and a separating action upon the crop stream as it passes from front to rear. Grain and chaff separated from the straw falls under gravity through the grates 34.

The material falling from the separating apparatus 24, 25 is caught by one of two return pans 42, 44 mounted underneath the rotor cages 30. A first return pan 42 extends across the discharge width of the twin rotary units 24, 25 and is positioned to catch material from a front region of the separating apparatus. The first return pan 42 has a front edge 46 that extends forwardly beyond the front 34a of grate 34. A rear edge 48 resides below a point part way along the front region 28a, or threshing part, of the rotor 28.

The second return pan 44 is located behind the first return pan and is configured to catch the remainder of the material that falls from the separating apparatus 24, 25. As such, the second return pan 44 is significantly longer than the first return pan 42. A front edge 50 of the second return pan 44 is positioned in the vicinity of the rear edge 48 of the first return pan 42 so that the vast proportion of the material falling from the separating apparatus is caught by one of the return pans. However, an arrangement in which a longitudinal gap exists between the rear edge 48 of the first return pan 42 and the front edge 50 of the second return pan 44 remains within the scope of the invention.

Both return pans 42, 44 slope downwardly in the direction of material flow and are driven in an oscillating manner as per conventional return pans in combines today. Collected material is thus conveyed in a generally forward direction (toward the front of the combine 10) and deposited from the respective front edges 46, 50 onto an underlying grain pan (or stratification pan) 60.

The grain pan 60 is also driven in an oscillating manner and serves to convey the crop-MOG mixture rearwardly to a rear edge 62 from where the mixture is deposited into the cleaning unit which is designated generally at 64. During conveyance the grain-MOG mixture is encouraged to stratify so that the heavier grain settles on the bottom layers whereas the lighter MOG rises to the top.

A relatively high grain-rich mixture of material is deposited by the first return pan 42 onto a front region of stratification pan 60 as indicated by arrow A. This relatively clean material settles onto the pan 60 and is conveyed rearwardly. As indicated by arrow B, a relatively high MOG-rich mixture of material is deposited by the second return pan 44 onto stratification pan 60 at a location behind that made by the first return pan 44. This MOG-rich mixture is thus deposited on top of the grain-rich mixture thus aiding stratification of the overall crop mixture.

As the crop stream falls from the rear edge 62 of the grain pan 60, the lighter material on top is blown rearwardly by a cleaning airstream indicated by arrow X and generated by fan 66 (FIG. 2). The aforementioned stratification allows this lighter material to be blown rearwardly uninterruptedly as represented by arrow 72. The heavier grain-rich material tends to cascade onto a first sieve 68 and through this onto a second sieve 70 as in known combine cleaning units.

First sieve 68 and second sieve 70 are driven in an oscillating manner. Straw and material which is too large to pass through first sieve 68 is conveyed rearwardly by the oscillating motion before falling from the rear edge and out of the rear of the combine.

Tailings, or unthreshed grain, and grain passes through first sieve 68 onto second sieve 70. Grain falls through second sieve 70 onto an underlying collection trough 72 which directs the clean grain to a transverse delivery auger (not shown) for delivering the grain to the storage tank.

The tailings which cannot pass through the holes in second sieve 70 are conveyed rearwardly by the oscillating motion before falling from the rear edge of the sieve 70 onto a tailings collection pan 74 which delivers the tailings to a rethreshing delivery auger (not shown).

Although shown as oscillating or vibrating pans, one or both of the return pans 42, 44 could be replaced by belt conveyors mounted on rollers whilst remaining within the scope of the invention.

Although shown as a twin rotor system, the processor may comprise only a single rotary unit. Alternatively, the processor may be of the hybrid-type with a tangential-flow threshing cylinder upstream of one or more rotary units.

The front edge 50 of the rear-most return pan 44 is described and shown as residing immediately behind the rear edge 48 of the forward-most return pan 42. However, it is envisaged that the front edge 50 may reside in front and below rear edge 48 thus giving an overlap between the two return pans 42, 44. Alternatively, the front edge 50 may reside behind the rear edge 48 thus leaving a gap between the return pans 42, 44, the gap allowing a portion of the material discharged from the rotary units 24, 25 to fall directly onto the stratification pan 60 or into the cleaning shoe 64.

Although described as having two return conveyors, the combine harvester may comprise more than two without deviating from the scope of the invention.

From reading the present disclosure, other modification will be apparent to persons skilled in the art. Such modifications may involve other features which are already known in the field of combine harvesters and component parts therefore and which may be used instead of or in addition to features already described herein.

In summary there is provided a combine harvester comprising axial separating apparatus. The axial separating apparatus comprises at least one rotor mounted for rotation in a rotor cage and is arranged to convey crop material in a spiral path from a front end to a rear end. The rotors may also serve to thresh the crop material before separation. The rotor cage includes a grate for allowing separated grain to fall there through under gravity. Two return conveyors are positioned below the grate, one behind the other. A first return conveyor disposed under a front portion of the separating apparatus is arranged to catch a portion of said separated grain and convey the caught grain forwardly to a first front edge from where the grain falls under gravity onto a first region of an underlying grain pan. A second return conveyor disposed under a rear portion of the separating apparatus is arranged to catch a portion of said separated grain and convey the caught grain forwardly to a second front edge from where the grain falls under gravity at a distance located behind the first region. The grain pan serves to convey the collected grain in a rearward direction to a cleaning unit.

The invention claimed is:

1. A combine harvester comprising an axial separating apparatus having at least one rotor mounted for rotation in a rotor cage and arranged to convey crop material in a spiral path from a front end to a rear end, the rotor cage including a grate for allowing separated grain to fall there through under gravity, a first return conveyor disposed under a front portion of the separating apparatus and arranged to catch a portion of said separated grain and convey the caught grain forwardly to a first front edge of said first return conveyor from where the grain falls under gravity onto a first region of an underlying grain pan, a second return conveyor disposed under a rear portion of the separating apparatus and arranged to catch a portion of said separated grain and convey the caught grain forwardly to a second front edge of said second return conveyor from where the grain falls under gravity onto said grain pan at a distance located behind the first region, the grain pan serving to convey the collected grain in a rearward direction to a cleaning unit.

2. A combine harvester according to claim 1, wherein the first return conveyor comprises a first oscillating return pan.

3. A combine harvester according to claim 1, wherein the second return conveyor comprises a second oscillating return pan.

4. A combine harvester according to claim 1, wherein the separating apparatus comprises a pair of axial separating rotors arranged in a side-by-side relationship.

5. A combine harvester according to claim 1, wherein the first return conveyor has a rear edge that resides over the grain pan.

6. A combine harvester according to claim 1, wherein the second front edge is disposed forwardly of a rear edge of the grain pan.

7. A combine harvester according to claim 1, wherein the second return conveyor is at least twice as long as the first return conveyor.

* * * * *